(12) United States Patent
Vellanki

(10) Patent No.: US 8,730,194 B2
(45) Date of Patent: May 20, 2014

(54) FINGER STYLUS FOR USE WITH CAPACITIVE TOUCH PANELS

(71) Applicant: Nano Nails, LLC, Helena, MT (US)

(72) Inventor: Latha Sree Vellanki, Helena, MT (US)

(73) Assignee: Nano Nails, LLC, Helena, MT (US)

( * ) Notice: Subject to any disclaimer, the term of this patent is extended or adjusted under 35 U.S.C. 154(b) by 3 days.

(21) Appl. No.: 13/627,100

(22) Filed: Sep. 26, 2012

(65) Prior Publication Data

US 2013/0076690 A1    Mar. 28, 2013

Related U.S. Application Data

(60) Provisional application No. 61/539,195, filed on Sep. 26, 2011.

(51) Int. Cl.
    *G06F 3/033*    (2013.01)
(52) U.S. Cl.
    USPC ............................. 345/173; 345/174; 345/179
(58) Field of Classification Search
    USPC .................................................. 345/174–179
    See application file for complete search history.

(56) References Cited

U.S. PATENT DOCUMENTS

| | | |
|---|---|---|
| 4,177,698 A | 12/1979 | Greneker |
| 4,625,615 A | 12/1986 | Lukehart |
| 4,625,616 A | 12/1986 | McVicker |
| 4,741,239 A | 5/1988 | Crafton |
| 4,843,942 A | 7/1989 | Ishizuka |
| 4,867,032 A | 9/1989 | Lukehart |
| 4,879,940 A | 11/1989 | Pereira |
| 5,323,677 A | 6/1994 | Knutson |
| 5,405,206 A | 4/1995 | Bedol |
| 5,453,759 A | 9/1995 | Seebach |
| 5,529,415 A | 6/1996 | Bishop |
| 5,706,026 A * | 1/1998 | Kent et al. ...................... 345/156 |
| 5,885,018 A | 3/1999 | Sato |
| D418,494 S | 1/2000 | Robb |

(Continued)

FOREIGN PATENT DOCUMENTS

| | | |
|---|---|---|
| JP | 07-261925 | 10/1995 |
| JP | 11-134103 | 5/1999 |

(Continued)

OTHER PUBLICATIONS

Park hyun jin, Finger Stylus; http://c9design.co/?p=52; posted: Apr. 8, 2011, 1 page.

(Continued)

*Primary Examiner* — Van Chow
(74) *Attorney, Agent, or Firm* — Marsh Fischmann & Breyfogle LLP

(57) ABSTRACT

Capacitive styluses and methods for use thereof. A stylus according to the present application may include a finger engagement portion adapted to engage the finger of a user. Furthermore, the stylus may include an extension portion that is adapted to extend beyond the distal tip of the finger of the user. An electrically conductive contact surface may be disposed beyond the distal tip of the finger and be contactable with a capacitive touch panel. An electrically conductive path may be provided between the contact surface and the finger engagement portion to establish electrical communication therebetween. The contact surface may be of sufficient size to affect a capacitive sensor of a capacitive touch panel when in contact therewith and when the stylus is mounted to the finger of a user.

21 Claims, 9 Drawing Sheets

(56) References Cited

U.S. PATENT DOCUMENTS

| | | | |
|---|---|---|---|
| 6,075,189 A | 6/2000 | Robb | |
| 6,225,988 B1 | 5/2001 | Robb | |
| 6,249,277 B1 | 6/2001 | Varveris | |
| 6,335,477 B1 | 1/2002 | Miller | |
| 6,533,480 B2 | 3/2003 | Schneider | |
| 6,626,598 B2 | 9/2003 | Schneider | |
| 6,631,723 B1 | 10/2003 | Mullin | |
| 6,797,871 B2 | 9/2004 | Atkin | |
| 6,910,821 B1 | 6/2005 | Smith | |
| 6,972,754 B2* | 12/2005 | Zank | 345/179 |
| 7,154,483 B2 | 12/2006 | Kobayashi | |
| 7,179,976 B2 | 2/2007 | West | |
| 7,416,358 B2 | 8/2008 | Legendre | |
| D597,547 S | 8/2009 | Smith | |
| D610,145 S | 2/2010 | Smith | |
| D616,447 S | 5/2010 | Smith | |
| D618,243 S | 6/2010 | Chamblin | |
| 2001/0053306 A1 | 12/2001 | Schneider | |
| 2003/0031496 A1 | 2/2003 | Schneider | |
| 2004/0150616 A1 | 8/2004 | Murphy | |
| 2005/0062730 A1 | 3/2005 | Birecki | |
| 2005/0093835 A1 | 5/2005 | Mortarelli | |
| 2007/0013681 A1 | 1/2007 | Chou | |
| 2008/0106521 A1 | 5/2008 | Nave | |
| 2008/0117189 A1 | 5/2008 | Flachsbart | |
| 2008/0297493 A1 | 12/2008 | Adkins | |
| 2009/0167727 A1 | 7/2009 | Liu et al. | |
| 2009/0278818 A1 | 11/2009 | DiNozzi et al. | |
| 2010/0039392 A1 | 2/2010 | Pratt et al. | |
| 2010/0225614 A1 | 9/2010 | Sung | |
| 2011/0128249 A1* | 6/2011 | Fan et al. | 345/174 |
| 2013/0169601 A1* | 7/2013 | Mo et al. | 345/179 |

FOREIGN PATENT DOCUMENTS

| | | |
|---|---|---|
| JP | 08-044333 | 2/2008 |
| JP | 10-003279 | 1/2010 |
| KR | 10-2011-0091932 | 8/2011 |
| KR | 10-2011-0093018 | 8/2011 |

OTHER PUBLICATIONS

PCT/US2012/057309 International Search Report and Written Opinion, mailed Mar. 29, 2013, 8 pgs.

* cited by examiner

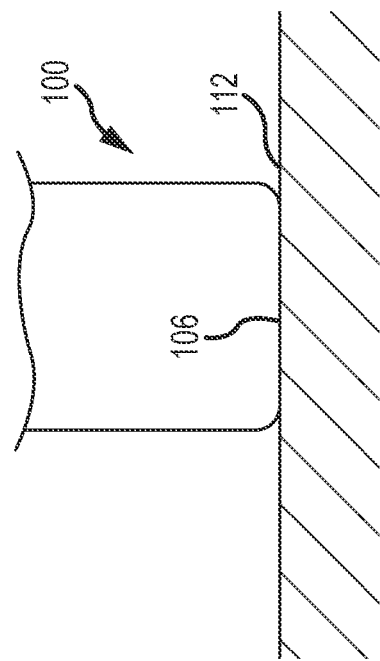
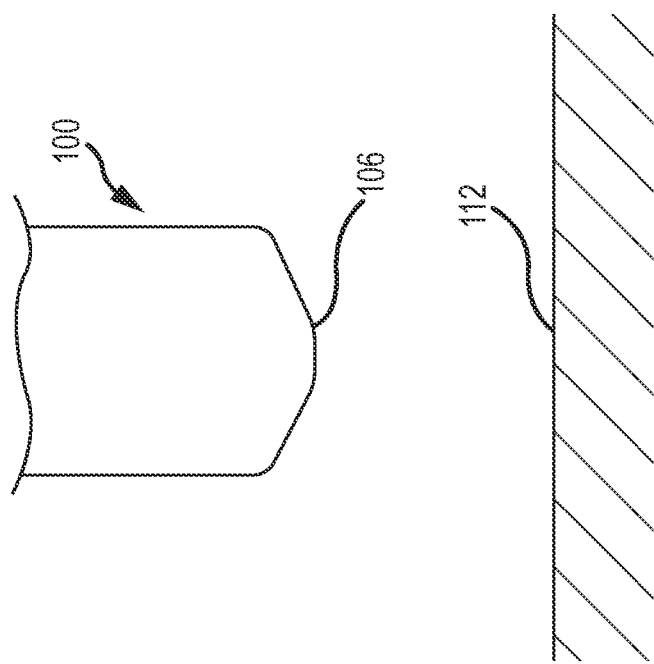

FINGER STYLUS FOR USE WITH CAPACITIVE TOUCH PANELS

CROSS-REFERENCE TO RELATED APPLICATIONS

This application claims priority to U.S. Provisional Patent Application No. 61/539,195 filed Sep. 26, 2011, entitled "FINGER STYLUS FOR USE WITH CAPACITIVE TOUCH PANELS," which application is incorporated herein by reference in its entirety.

FIELD

The present disclosure is generally related to styluses for use with touch sensitive panels and in particular to styluses for use with capacitive touch panels, wherein the stylus is adapted to engage the finger of a user to facilitate manipulation of the capacitive touch panel by the user utilizing the stylus.

BACKGROUND

Capacitive touch panels have become commonly used as input devices for a variety of types of electronic devices (e.g., cellular telephones, tablet computers, laptop computers, computer monitors, etc.). Capacitive touch panels generally operate by sensing a change in the electrostatic field generated by conductors (e.g., transparent conductors) separated by an insulator (e.g., glass or other non-conductive substrate). When one of the conductors is contacted by an external conductive body, the capacitive touch panel is affected (i.e., the electrostatic field generated by the conductors and insulator is altered). The change in the electrostatic field is measured as a change in capacitance. For example, the change in capacitance may be detected by electronics provided with the capacitive touch panel such that the occurrence of, and the location of, the contact between the external conductive body and the capacitive touch panel may be determined and interpreted as an input. However, a non-conductive body in contact with one of the conductors will not alter the electrostatic field, and thus will not be sensed (i.e., will not affect the capacitive touch sensor). Because capacitive touch panels may be constructed of substantially transparent components, capacitive touch panels are often used in conjunction with displays to create a capacitive touch screen that serves simultaneously as a display and input device.

Because the human body is a conductor, contact of the skin of an individual may affect a capacitive sensor of a capacitive touch panel (i.e., alter the electrostatic field of the capacitive sensor sufficiently such that the change in capacitance can be interpreted as an input). In this regard, the use of capacitive touch sensors may not require the use of a stylus or other object to affect the sensor as may be the case with some other types of touch panels (e.g., resistive touch panels).

However, the anatomy of the fingers of different individuals may vary widely. For example, some individuals may have large fingers. Accordingly, in the case of a capacitive touch screen, a large portion of the display may be obstructed by the user's finger when the finger is used to contact the capacitive touch screen. Also, a user with a large finger may have difficulty selecting a desired portion of the screen as part of an input because the individual's finger may be larger than the target the user is attempting to manipulate on the graphical user interface of the device.

Furthermore, individuals with fingernails that extend significantly beyond the distal end of the finger tip may have difficulty in manipulating a capacitive touch panel. The conductivity and/or size of the user's fingernail in contact with the capacitive touch panel may be insufficient to affect the capacitive sensor or the touch panel, thus preventing the user from manipulating the capacitive sensor with the user's fingernail. For example, while the fingernail of a user may be conductive, the size of the fingernail at the distal edge thereof may be insufficient to produce a response by a capacitive touch panel. Accordingly, such users may have to contact the capacitive touch panel with the pad of the finger rather than the distal tip of the finger. Accordingly, the problems addressed above with regard to individuals with large fingers may be experienced by individuals with relatively long fingernails as the pad of the user's finger may be substantially larger than the distal tip of the user's finger.

Attempts have been made to develop capacitive styluses for use with capacitive touch panels. However, a number of drawbacks are present in previous capacitive styluses. For example, stylus devices resembling a traditional writing instrument have been proposed. As such, a user may hold such a stylus device like a traditional writing instrument for use with a capacitive touch panel. However, many graphical user interfaces of devices employing capacitive touch panels have been specifically designed to take advantage of the use of an individual's finger or fingers to manipulate the capacitive touch panel. In this regard, a stylus held like a traditional writing instrument may impede the ability of the user to take advantage of these graphical user interfaces. For example, the functionality of the graphical user interface may be specifically designed to take advantage of the use of the individual's fingers to manipulate the capacitive touch panel (e.g., with specifically designed keyboard layouts, controls, menus, etc.). Additionally, user interfaces may employ touch gestures such as pinching motions or other multi-touch gestures. Furthermore, some such styluses include a round tip shape that may obscure a significant portion of the display when in use. Accordingly, styluses shaped as traditional writing instruments tend to limit the user's ability to take advantage of features specifically designed for manipulation of the capacitive touch panel with the user's finger and may still be subject to the problem of screen obstruction.

SUMMARY

A stylus is presented herein that is adapted for engagement with the finger of a user such that the stylus may be used to manipulate a capacitive touch panel. For example, the stylus may be used to interact with a capacitive touch panel integrated with a display to define a capacitive touch screen, such that the stylus contacts the capacitive touch panel in a manner that improves the visualization of the display while maintaining functionality as a stylus. In one embodiment, the finger of the user to which the stylus is attached may be positioned relative to the capacitive touch screen when using the stylus in a manner similar to the position of a finger manipulating the capacitive touch panel without use of the stylus (e.g., substantially perpendicular to the capacitive touch panel).

The stylus may include a conductive path establishing electrical communication between a finger engagement portion adapted for engagement with a finger of the user and an electrically conductive contact surface. Accordingly, when the stylus is mounted to the finger of a user, contact between the contact surface and a capacitive sensor of a capacitive touch panel may affect the capacitive sensor such that the contact may be used to manipulate the capacitive touch panel. It will be appreciated that affecting the capacitive sensor may mean altering the electrostatic field of the capacitive sensor to produce a sufficient change in capacitance so that the change in capacitance can be interpreted as an input.

One aspect described herein includes a finger mountable stylus for use with a capacitive touch panel. The stylus may be used to manipulate the capacitive touch panel by affecting a capacitive sensor of the capacitive touch panel with the stylus. The stylus includes a finger engagement portion configured to engage with a finger when the stylus is mounted to the finger for use with a capacitive touch panel. The stylus also includes an extension portion configured to extend beyond a distal tip of the finger when the stylus is mounted to the finger. The stylus also includes an electrically conductive contact surface at the distal end of the extension portion. The contact surface is configured to make contact with the capacitive touch panel to manipulate the capacitive touch panel. The stylus further includes an electrically conductive path between the contact surface and the finger engagement portion to establish electrical communication between the capacitive touch panel and the finger when the stylus is mounted to the finger and when the contact surface contacts the capacitive touch panel to manipulate the capacitive touch panel.

Another aspect described includes a method of using a finger mountable stylus with a capacitive touch panel to manipulate the capacitive touch panel by affecting a capacitive sensor of the capacitive touch panel. The method includes mounting the stylus to a finger, wherein an electrically conductive contact surface is disposed beyond a distal tip of the finger. Further, the method includes contacting the contact surface to a capacitive touch panel and establishing electrical communication between the capacitive touch panel and the finger. The method further includes affecting the capacitive touch sensor of the capacitive touch panel in response to the contacting and establishing operations. Also, the method includes manipulating the capacitive touch panel in response to the affecting.

A number of feature refinements and additional features are applicable to the aspects presented herein. These feature refinements and additional features may be used individually or in any combination. As such, each of the following features that will be discussed may be, but are not required to be, used with any other feature or combination of features of the aspects presented herein.

For example, in one embodiment, the contact surface may be of sufficient area to affect the capacitive sensor of the capacitive touch panel when the contact surface is contacted with the capacitive touch panel. In an embodiment, the area of the contact surface may be not smaller than about 0.4 mm$^2$. In an embodiment, the area of the contact surface may be not smaller than about 16 mm$^2$. In an embodiment, the area of the contact surface may be not larger than about 25 mm$^2$. In some embodiments, the contact surface may have an area not smaller than about 1 mm$^2$, 5 mm$^2$, 7 mm$^2$, 9 mm$^2$, 10 mm$^2$, 12 mm$^2$, 15 mm$^2$, or even 18 mm$^2$. In an embodiment, the area of the contact surface may be not larger than about 25 mm$^2$. In some embodiments, the area of the contact surface may be not larger than about 35 mm$^2$, 30 mm$^2$, or even 20 mm$^2$.

Additionally, the contact surface may have a first dimension, which may extend in a direction generally corresponding to a width direction of the finger. The contact surface may also have a second dimension, which may extend in a direction generally corresponding to a depth direction of the finger. The first and second dimensions may be major and minor dimensions of an areal extent of the contact surface. In one embodiment, the first dimension may be larger than the second dimension. For example, the first dimension may be in a range of from 3 mm to 12 mm. In an embodiment, the first dimension may be in a range from 4 mm to 8 mm. In some embodiments, the first dimension may be not smaller than 5 mm, 6 mm, or even 7 mm. In an embodiment, the first dimension may be not larger than 10 mm, 9 mm or even 8 mm. The second dimension may be in a range of from 0.075 mm to 5 mm. In an embodiment, the second dimension may be in a range of from 1 mm to 2.5 mm. In some embodiments, the second dimension may be not smaller than about 0.1 mm, 0.25 mm, 0.5 mm, 0.75 mm, or even 1.5 mm. In some embodiments, the second dimension may be not larger than about 1.5 mm, 2 mm, 2.25 mm, 3 mm, or even 3.5 mm.

In an embodiment, the extension portion may dispose the contact surface distally beyond a distal tip of the finger by a distance not smaller than 0.5 mm. In some embodiments, the contact surface may be disposed beyond the distal tip of the finger by a distance not smaller than 0.1 mm, 0.25 mm, or even 0.75 mm. The contact surface may extend in a direction corresponding with the second dimension above an exposed top surface fingernail by not more than about 3 mm. In some embodiments, the contact surface may extend above a corresponding adjacent portion of the exposed top surface of the fingernail by a distance not larger than 1 mm, 1.5 mm, 2 mm, or 2.5 mm. Furthermore, the contact surface may extend in a direction corresponding with the second dimension below an exposed top surface of the fingernail by not more than about 3 mm. In some embodiments, the contact surface may extend below a corresponding adjacent portion of the exposed top surface of the fingernail by a distance not larger than 1 mm, 1.5 mm, 2 mm, or 2.5 mm.

In an embodiment, the contact surface of the stylus can be angled from 10 degrees to 90 degrees relative to the length of a user's finger when the stylus is mounted to the finger of a user. For example, the angle of the contact surface may be chosen based at least partially on the preference of the user or the application for which the stylus will be used. In this regard, it may be appreciated that the angle of the contact surface may vary the angle at which a user's finger is disposed relative to the capacitive touch panel when the stylus is used to manipulate the capacitive touch panel.

In another embodiment, the first dimension of the stylus may correspond to the direction of text displayed on a capacitive touch screen that may be manipulated by the stylus when engaged with the finger of a user. As such, the orientation of the first dimension in corresponding relation to the direction of text displayed on the capacitive touch screen may facilitate improved ability to select text (e.g., selection of a hyperlink embedded in text) when using the stylus.

In an embodiment, the contact surface may be deformable and the contact surface may deform to conformably contact the surface of the capacitive touch panel when contacted with the capacitive touch panel to manipulate the capacitive touch panel. The contact surface may be an electrically conductive surface portion of the stylus configured to be in contact with a capacitive touch panel when the stylus is used to manipulate the panel.

The electrically conductive path may comprise a material chosen from a group of electrically conductive materials consisting of, for example, gold, copper, silver, aluminum, steel, other conductive metals; metal alloys; metal coatings; conductive polymers; conductive paints; conductive films; conductive adhesives; conductive tapes; transparent conductive oxides; and any combinations thereof. In an embodiment, the stylus may consist essentially of an electrically conductive material. For example, the electrically conductive material may be an inherently electrically conductive polymer such as, for example, polyacetylene, polypyrrole, polyaniline, or copolymers of any of the foregoing. The electrically conductive material may comprise a polymer that includes a conductive additive that promotes electrical conductivity by the addition of the conductive additive. Examples of conductive additives that may be introduced with a polymer to promote electrical conductivity may include, but are not limited to, carbon fibers, carbon nanoparticles, silver and/or nickel coated carbon fibers, stainless steel fibers, and any combinations thereof. In an embodiment, the stylus may include a conductive thin film applied to the body thereof. For example, a conductive material may be applied to the stylus by way of a coating process such as vacuum metallization, a vapor deposition process, electroplating, foil stamping, an electrically conductive paint coating, or other appropriate coating processes. The stylus may be manufactured by injection molding or thermoforming. Additionally, co-molding and overmolding processes may be used as well. In another embodiment, the stylus device may be cast from a conductive material (e.g., aluminum or the like). Combinations or variations of any of these manufacturing processes may be utilized in the manufacture of a stylus.

The extension portion may be configured to dispose the contact surface beyond a distal edge of the fingernail when the stylus is mounted to the finger. For example, the contact surface may be disposed beyond the distal edge of the fingernail by not less than about 0.5 mm.

In an embodiment, the stylus may include an attachment surface for attachment to at least a portion of the exposed top surface of the fingernail when the stylus is mounted to the finger. The attachment surface may contact substantially all of the exposed top surface of the fingernail when the stylus is mounted to the finger.

Additionally or alternatively, the stylus may include an attachment structure adapted for sliding attachment to a finger. The attachment structure may be sized to extend about at least a portion of the finger. As such, the attachment structure may be adapted to grippingly engage a finger when the stylus is mounted to the finger. For example, the attachment structure may include a first and a second opposing arcuate projection, each of the first and the second opposing arcuate projections including a free end portion, wherein the free end portions are spaced apart and opposing.

Additionally, the mounting operation may include attaching an attachment surface of the stylus to at least a portion of a fingernail of the finger (e.g., the exposed top surface of the fingernail). The mounting operation may alternatively include slideably engaging an attachment structure with a distal end portion of the finger. In an embodiment, the manipulating may comprise moving the contact surface with respect to the capacitive touch panel while maintaining the contact surface in contact with the capacitive touch panel, wherein electrical communication is maintained between the capacitive touch panel and the finger during the moving operation.

BRIEF DESCRIPTION OF THE DRAWINGS

FIGS. 7A and 7B illustrate an embodiment of a conformably deformable contact surface.

DETAILED DESCRIPTION

Figure 1:
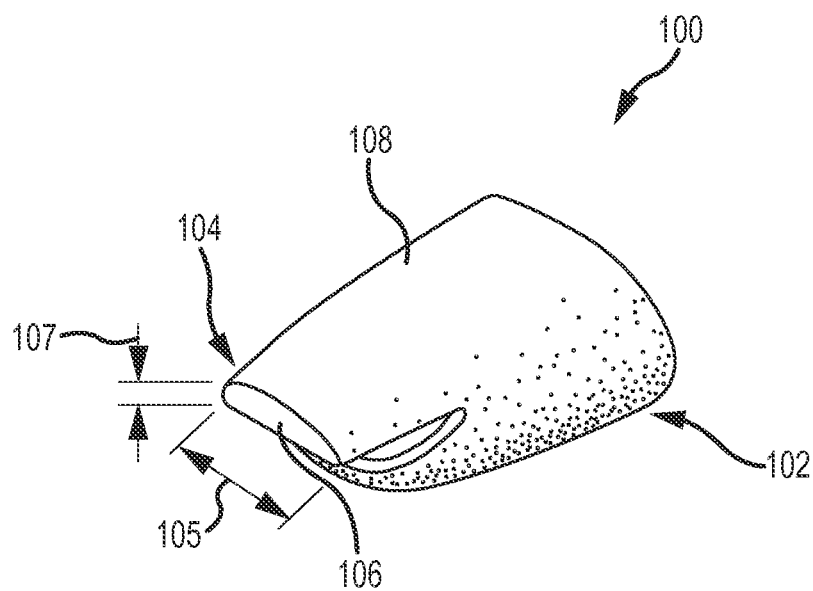
FIG. 1 is a perspective view of an embodiment of a stylus for use with a capacitive touch panel.
Figure 2:
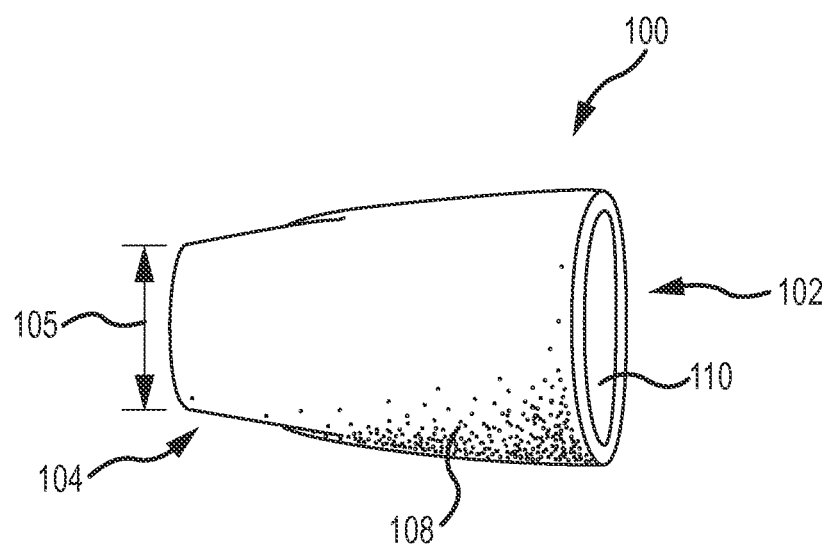
FIG. 2 is a top view of the embodiment shown in FIG. 1.
Figure 3:
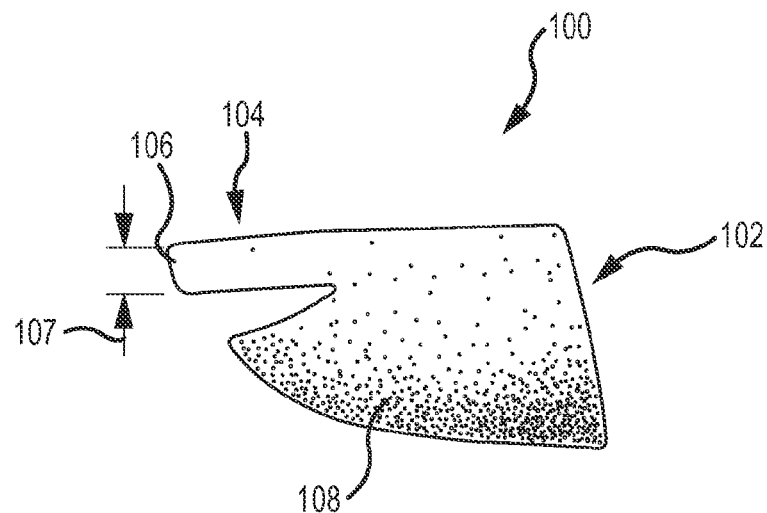
FIG. 3 is a side view of the embodiment shown in FIG. 1.

With reference to FIGS. 1-3, an embodiment of a stylus 100 is depicted. The stylus 100 may include a finger engagement portion 102 disposed toward a proximal end of the stylus 100 and an extension portion 104 extending distally from a distal end of the stylus 100. The finger engagement portion 102 is adapted to be selectively attachable to the finger of a user. The finger engagement portion 102 may be in electrically conductive communication with the finger of a user when the stylus 100 is mounted to the user's finger (e.g., in electrically conductive communication with the skin of the finger of a user and/or a portion of the fingernail of the user). The extension portion 104 includes a contact surface 106 at the distal end thereof. The extension portion 104 is adapted to extend beyond a distal tip of a finger of a user when the stylus 100 is mounted to the finger of a user. Accordingly, the contact surface 106 is configured to make contact with a capacitive touch panel 112 when the stylus 100 is mounted to the finger 116 of a user, as is shown in FIG. 8.

Continuing with reference to FIGS. 1-3, the contact surface 106 may be electrically conductive. Additionally, an electrically conductive path may be provided between the contact surface 106 and the finger engagement portion 102 to establish electrical communication between the contact surface 106 and the finger 116 of a user when the finger engagement portion 102 is mounted to a finger 116 of the user. For example, in the embodiment depicted in FIGS. 1-3, a body 108 of the stylus 100 may be constructed from an electrically conductive material. As such, an inner surface 110 of the stylus 100 may contact the finger 116 of a user when the stylus 100 is mounted to the finger 116. Accordingly, the electrically conductive path may be established between the contact surface 106 and the finger 116 of a user to facilitate electrical conductivity through the body 108 of the stylus 100, wherein electrical communication between the stylus 100 and the finger 116 of a user is established by way of contact between the inner surface 110 of the body 108 and the finger 116 of the user when the stylus 100 is mounted thereon. For example, the body 108 may be constructed from an electrically conductive polymer (e.g., polyacetylene, polypyrrole, polyaniline, copolymers of any of the foregoing, any other appropriate conductive polymers, or any combination thereof). Further still, the body 108 may include a polymer with a conductive additive such as, for example, carbon fibers, carbon nanoparticles, silver and/or nickel coated carbon fibers, stainless steel fibers, and any combinations thereof. In another embodiment, the stylus 100 may include a conductive coating. For example, the stylus 100 may undergo a vapor deposition process to apply a conductive coating to the stylus 100. In yet another embodiment, the stylus 100 may be manufactured from a conductive material such as, for example, aluminum. In this regard, the stylus 100 may be cast from the conductive material, stamped from the conductive material, or otherwise manufactured from the conductive material.

Additionally or alternatively, an electrically conductive path may be established between the contact surface 106 and the finger engagement portion 102. For example, an electrical conductor (not shown) may be provided that extends between the contact surface 106 and the finger engagement portion 102. Accordingly, the body 108 may not be electrically conductive. The electrical conductor may be embedded in the body 108 or may be disposed on the surface of the body 108 (e.g., in the form of a coating, a trace, or the like). The electrically conductive path, whether integral with the body 108 or provided as a separate discrete element different than the body 108, may comprise a material chosen from a group of electrically conductive materials consisting of, for example, a conductive metal such as gold, copper, silver, aluminum, steel, or a metallic alloy; conductive polymers; polymers comprising a conductive additive; conductive paints; conductive films; conductive adhesives; conductive tapes; transparent conductive oxides; and any combination thereof. The electrically conductive path extending between the electrically conductive contact surface 106 and the finger engagement portion 102 may allow for use of the stylus 100 for manipulation of a capacitive touch panel as will be described in greater detail below with respect to FIG. 8.

Figure 8:
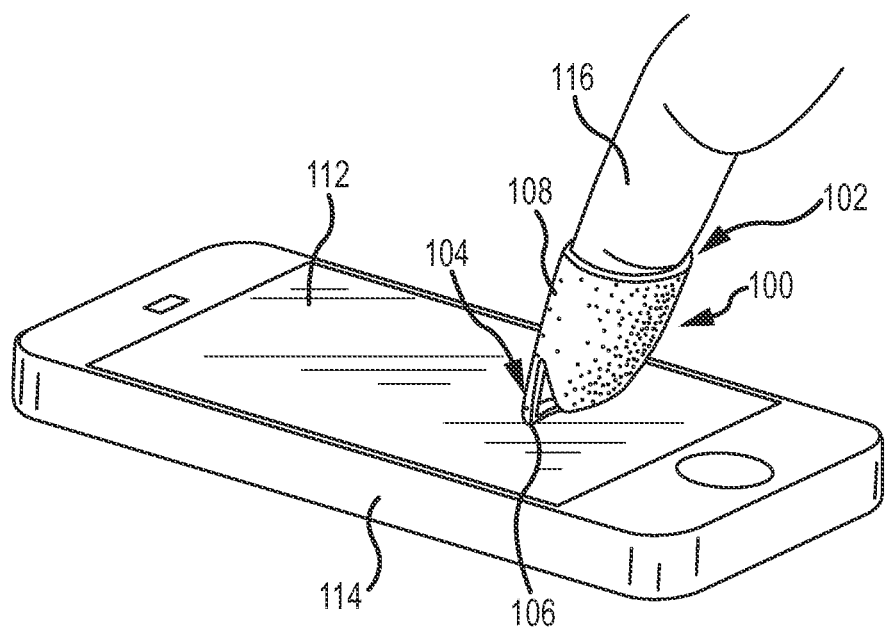
FIG. 8 is a perspective view of an embodiment of a stylus in use by a user to manipulate a capacitive touch panel of a device.

Continuing with reference to FIGS. 1-3, the contact surface 106 may have a first dimension 105 that extends in a direction generally corresponding with a width direction of the finger 116 of a user when the stylus 100 is mounted to the finger 116, as shown in FIG. 8. The contact surface 106 may also have a second dimension 107 extending in a direction generally corresponding with a depth direction of the finger 116 of a user when the stylus 100 is mounted to the finger 116. The first and second dimension 105 and 107 may correspond to the separation distance of the marginal extents of the contact surface 106.

In an embodiment, the first dimension 105 may be larger than the second dimension 107. For example, the first dimension 105 may be not smaller than about 4 mm. In same embodiments, the first dimension may be not smaller than 5 mm, 6 mm, or even 7 mm. In an embodiment, the first dimension 105 may be not larger than about 12 mm. In same embodiments, the first dimension 105 may be not larger than 10 mm, 9 mm or even 8 mm. In an embodiment, the second dimension 107 may be not smaller than about 0.075 mm. In same embodiments, the second dimension 107 may be not smaller than about 0.1 mm, 0.25 mm, 0.5 mm, 0.75 mm, or even 1 mm. In an embodiment, the second dimension 107 may be not larger than about 1 mm. In same embodiments, the second dimension 107 may be not larger than about 1.5 mm, 2 mm, 2.25 mm, 2.5 mm, or even 3 mm.

The contact surface 106 may be defined as the area configured to contact a capacitive touch screen panel 112 when in use. In an embodiment, the area of the contact surface 106 may be not smaller than about 0.4 mm². In some embodiments, the contact surface 106 may have an area of not smaller than about 1 mm², 5 mm², 7 mm², 9 mm², 10 mm², 12 mm², 15 mm², 16 mm², or even 18 mm². In an embodiment, the area of the contact surface 106 may be not larger than about 25 mm². In some embodiments, the area of the contact surface 106 may be not larger than about 35 mm², 30 mm², or even 20 mm². In any regard, the area of the contact surface 106 may be of sufficient size to affect the capacitive touch panel 112 when the contact surface area 106 is appropriately contacted with the capacitive touch panel 112. By "affect the capacitive touch panel", it is meant that the capacitance of the capacitive sensor is altered sufficiently to be interpreted as an input (e.g., by electronics provided with the capacitive touch panel). It has been found that the threshold for the minimum area in contact with a capacitive touch panel to affect the capacitive touch panel varies for different devices. It has been found that an area of the contact surface 106 not smaller than about 16 mm² appears to be operative to affect a majority of capacitive touch panels of various devices tested. For example, a test was conducted wherein contact surfaces of various sizes were contacted to the capacitive touch panels of various devices to determine if the contact of the surface area to the capacitive touch panel was interpreted as an input. The results of the test are summarized below in Table 1. A "y" indicates a touch was interpreted as an input by the device and an "n" indicates a touch was not interpreted as an input by the device.

TABLE 1

| | Contact Surface Dimensions | | | Devices Tested | | |
|---|---|---|---|---|---|---|
| Contact Surface Sample No. | First Dimension (mm) | Second Dimension (mm) | Area (mm²) | Samsung Fascinate ™ | Apple ® iPhone ® 4 | iPod touch ® 4th Gen |
| 1 | 6.5 | 0.075 | 0.4875 | y | n | n |
| 2 | 7 | 1 | 7 | y | n | n |
| 3 | 6 | 1.5 | 9 | y | n | n |
| 4 | 7.5 | 1.25 | 9.375 | y | n | n |
| 5 | 7 | 1.5 | 10.5 | y | n | n |
| 6 | 6 | 2 | 12 | y | n | n |
| 7 | 8 | 1.5 | 12 | y | y | n |
| 8 | 7 | 2 | 14 | y | y | n |
| 9 | 8.5 | 1.75 | 14.875 | y | y | n |
| 10 | 6 | 2.5 | 15 | y | y | n |
| 11 | 8 | 2 | 16 | y | y | y |
| 12 | 7 | 2.5 | 17.5 | y | y | y |
| 13 | 9 | 2 | 18 | y | y | y |
| 14 | 8 | 2.5 | 20 | y | y | y |
| 15 | 9.5 | 2.25 | 21.375 | y | y | y |
| 16 | 10 | 2.5 | 25 | y | y | y |

Figure 6:
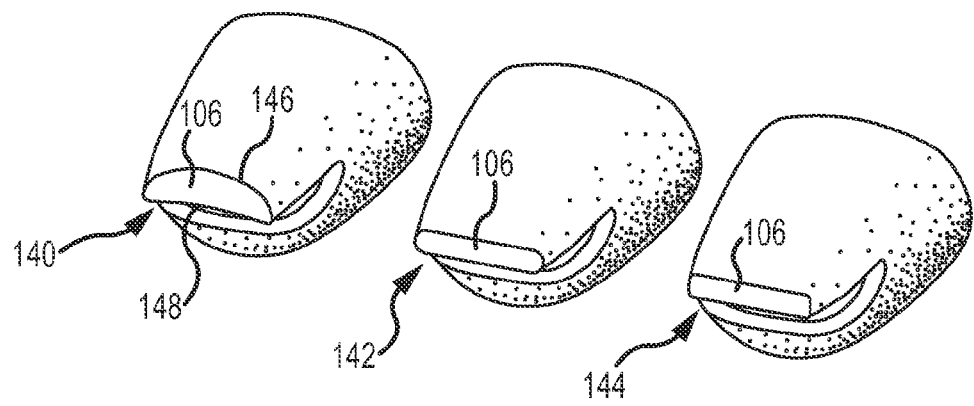
FIG. 6 illustrates a perspective view of various embodiments of contact surfaces for use with a stylus.

With reference to FIG. 6, various examples of embodiments of profiles of the contact surface 106 are shown. Any appropriate contact surface profile may be provided. For example, the contact surface 106 may have a generally crescent-shaped profile 140. The crescent-shaped profile 140 may include an upper arc 146 and a lower arc 148. The upper arc 146 and lower arc 148 may be substantially parallel or may have different curvatures. In one variation, the lower arc 148 may be substantially straight (e.g., a line) without curvature. The contact surface 106 may also have a rectilinear profile 144. Further still, the contact surface 106 may be of a generally rectangular shape wherein the intersection of the sides of the rectangle are rounded to form a profile as shown at 142 in FIG. 6. Additionally, other shapes for the contact surface 106 may be provided such as, for example, an elliptical or oval profile.

Figure 5:
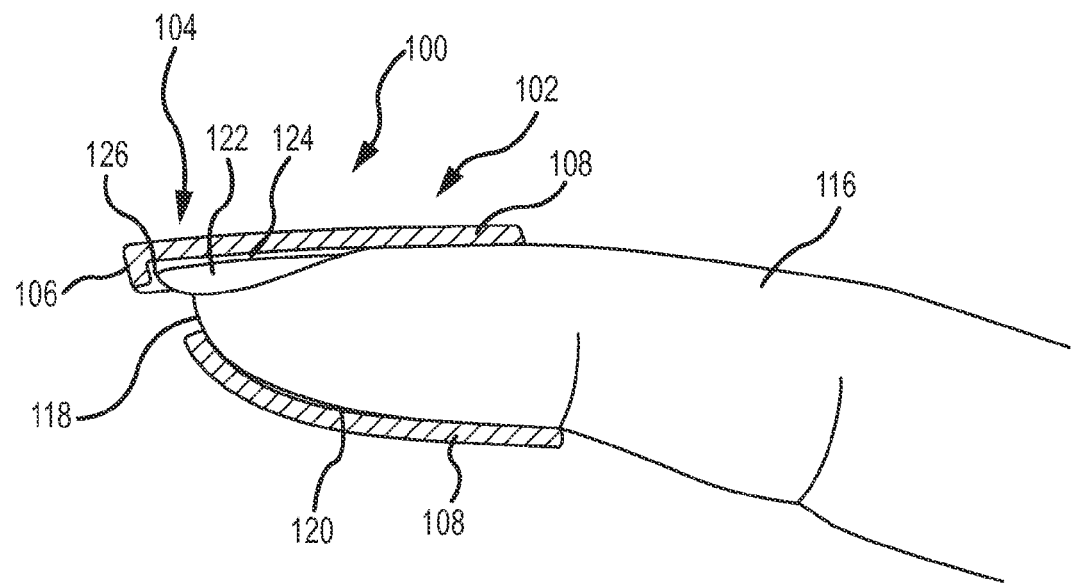
FIG. 5 is a cross sectional view of an embodiment of a stylus engaged with a user's finger.

With additional reference to FIG. 5, a cross-sectional view of the stylus 100 is shown engaged with the finger 116 of a user. The finger 116 generally includes a finger pad 120 corresponding with the surface of the finger 116 extending on the underside of the finger 116 and a distal tip 118 of the finger 116. The finger 116 also includes a fingernail 122. The fingernail 122 includes an exposed top surface 124. The fingernail 122 also includes a distal edge 126. As can be appreciated, the distal edge 126 of the fingernail 122 may extend distally beyond the distal tip 118 of the finger 116 as shown in FIG. 5.

In one embodiment, the stylus 100 may be slideably mounted to the finger 116. In this regard, the finger engagement portion 102 may surround at least a portion of the distal end of the finger 116. For example, the body 108 of the stylus 100 may be appropriately sized for sliding engagement with the finger 116 such that the body 108 extends about the distal end of the finger 100 and grippingly engages the finger 116. In this regard, the body 108 of the stylus 100 may be constructed from a resilient material that may accommodate the gripping engagement of the stylus 100 with respect to the finger 116. Additionally or alternatively, the stylus 100 may be provided in a variety of sizes to accommodate fingers 116 of different sizes.

Figure 4:
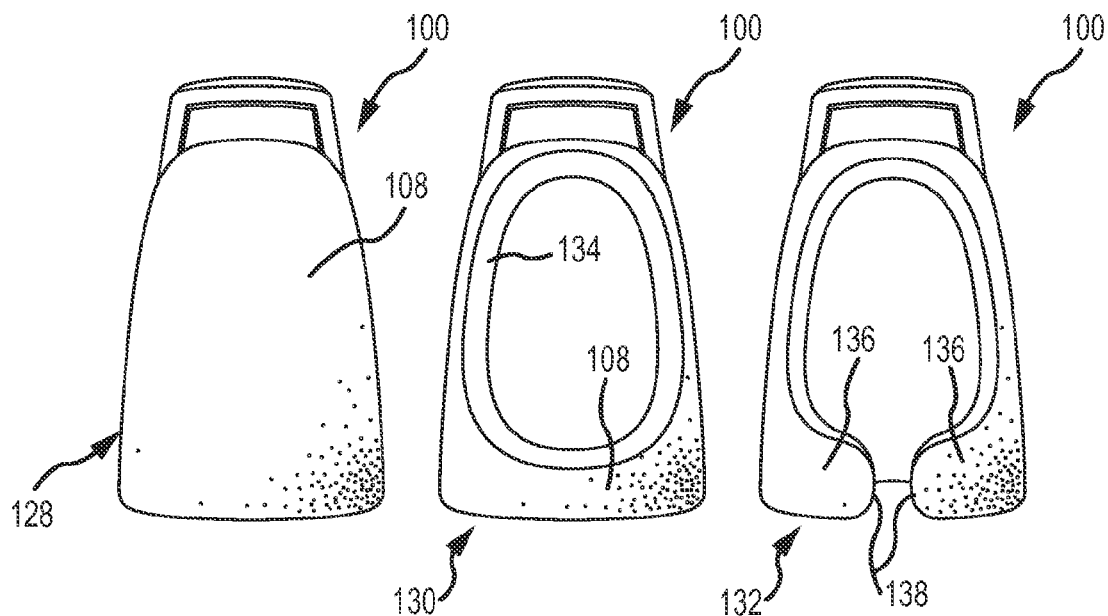
FIG. 4 includes bottom views of various embodiments of a finger attachment structure for use with a stylus.

With additional reference to FIG. 4, various embodiments of example finger attachment structures 128, 130 and 132 are shown for the stylus 100. One embodiment of attachment structure 128 may comprise the body 108 of the stylus 100 that is adapted to extend continuously about the distal portion of the finger 116 when the stylus is mounted to the finger 116. Another attachment structure 130 may include an aperture 134 extending through the body 108 of the stylus 100. The aperture 134 may be provided such that when the stylus 100 is mounted to the finger 116 of the user, the aperture 134 is provided adjacent to the pad 120 of the finger 116. Accordingly, the body 108 of the stylus 100 may not cover the pad 120. Further still, an attachment structure 132 may be provided for attachment of the stylus 100 to the finger 116 of a user. The attachment structure 132 includes opposing arcuate projections 136 adapted to extend about at least a portion of the finger 116 of the user when the stylus 100 is mounted to the finger 116. The opposing arcuate projections 136 may include respective free end portions 138 that are spaced apart from one another. As such, the arcuate projections 136 may be constructed from a resilient material that allows the free end portions 138 to be displaced away from and toward each other. As such, different sized fingers 116 may be accommodated by the flexing of the arcuate projections 136 when the attachment structure 132 is slidingly engaged with the finger 116 of the user.

Referring to FIG. 5, the extension portion 104 may dispose the contact surface 106 to a location beyond the distal tip 118 of the finger 116 when the stylus 100 is mounted to the finger 116. For example, the contact surface 106 may be disposed beyond the distal tip 118 of the finger 116 by a distance not smaller than 0.1 mm, 0.25 mm, 0.5 mm or even 0.75 mm. Furthermore, it will be appreciated from FIG. 5 that the contact surface 106 may extend above and/or below the exposed top surface 124 of the fingernail 122. By "extending above" and "extending below" the exposed top surface 124, it is meant that the contact surface 106 extends above or below a corresponding adjacent portion of the exposed top surface 124 of the fingernail 122. For example, the contact surface 106 may extend above or below a corresponding adjacent portion of the exposed top surface 124 of the fingernail 122 adjacent to the distal edge 126. For example, the contact surface 106 may extend above a corresponding adjacent portion of the exposed top surface 124 of the fingernail 122 by a distance not larger than 1 mm, 1.5 mm, 2 mm, 2.5 mm or even 3 mm. Additionally or alternatively, the contact surface 106 may extend below a corresponding adjacent portion of the exposed top surface 124 of the fingernail 122 by a distance not larger than 1 mm, 1.5 mm, 2 mm, 2.5 mm or even 3 mm.

Furthermore, the extension portion 104 may dispose the contact surface 106 beyond a distal edge 126 of the fingernail 122. For example, the extension portion 104 may dispose the contact surface 106 beyond the distal edge 126 of the fingernail 122 by a distance not smaller than about 0.1 mm, 0.25 mm, 0.5 mm or even 0.75 mm.

Additionally, as can be appreciated from FIGS. 7A and 7B, the contact surface 106 may be deformable. FIG. 7A depicts an example of a stylus 100 with a conformably deformable contact surface 106. The contact surface 106 may deform to conformably contact the surface of a capacitive touch panel 112 when contacted therewith, as shown in FIG. 7B. In this regard, the contact surface 106 may be defined as the portion of the distal end of the extension portion 104 in conformable contact with the capacitive touch screen panel. As such, the dimensions recited above in relation to the contact surface 106 may correspond to the portion of the contact surface 106 that is in conformable contact with the capacitive touch panel when the contact surface 106 is deformed by way of contact with the stylus 100 against the capacitive touch panel sufficient to affect the capacitive sensor of a capacitive touch panel. Furthermore, the dimensions recited above with respect to the contact surface 106 may refer to distances and areas extending along the surface of the contact surface 106 in its non-deformed state that correspond with the portion of the contact surface 106 that is deformed into conformable contact with the capacitive touch panel.

With reference to FIG. 8, the stylus 100 is shown mounted to a finger 116 of a user during use with a capacitive touch panel 112 of a device 114 (e.g., a smart phone). In this regard, the contact surface 106 may be in contact with the capacitive touch panel 112. As the contact surface 106 is in electrical communication with the finger 116 of the user by way of the electrically conductive path and finger engagement portion 102, the contact surface 106 may affect the capacitive sensor of the capacitive touch panel 112 by altering the electrostatic field of the capacitive touch panel 112. In this regard, the location at which the contact surface 106 is contacting the capacitive touch panel 112 may be resolved and the capacitive touch panel 112 may be manipulated with the stylus 100. As can be further appreciated from FIG. 8, the user's finger 116 may advantageously be perpendicular or nearly perpendicular to the capacitive touch panel 112 when the stylus 100 is in use to manipulate the capacitive touch panel 112. As such, the stylus 100 may not obscure a significantly larger portion of the capacitive touch panel 112 than is obscured when using the distal tip 118 of the finger 116 to manipulate the capacitive touch panel 112.

It may further be appreciated that the stylus 100 may be oriented with respect to the capacitive touch panel 112 such that the first dimension 105 is generally aligned with a direction of text displayed on the capacitive touch panel 112. In this regard, the shape of the contact surface 106 as defined by the first dimension 105 being larger than the second dimension 107 may result in the contact surface 106 being capable of selecting in-line text displayed on the capacitive touch panel 112. In this regard, for example, embedded hyperlinks provided in text may be more easily selectable using the stylus 100 with the contact surface 106 as described above to select hyperlinks from text. This may especially true for a grouping of hyperlinks in adjacent rows of text as my often be displayed.

Figure 9:
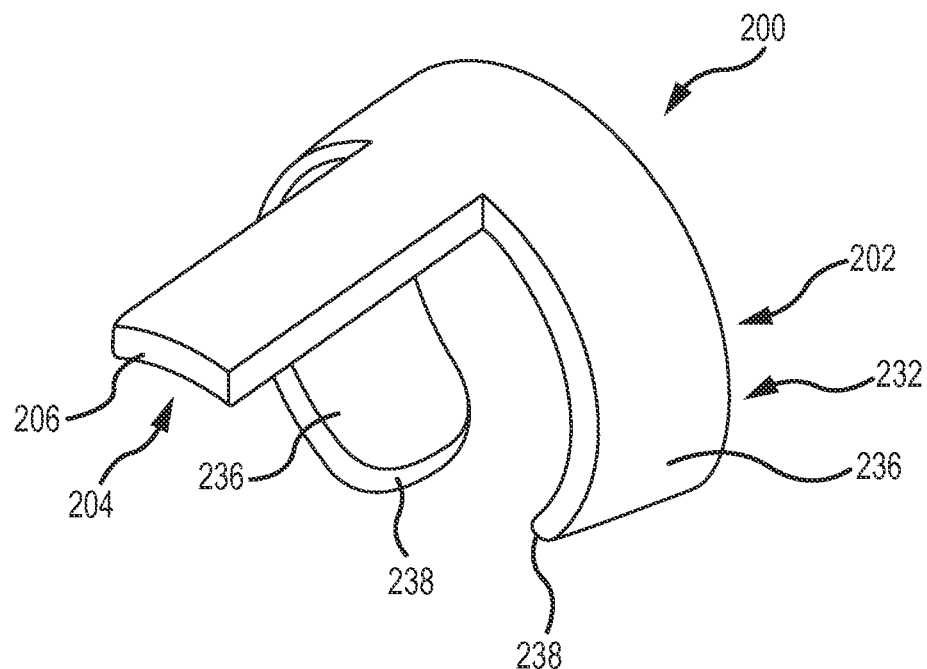
FIG. 9 is a perspective view of another embodiment of a stylus for use with a capacitive touch panel.
Figure 10:
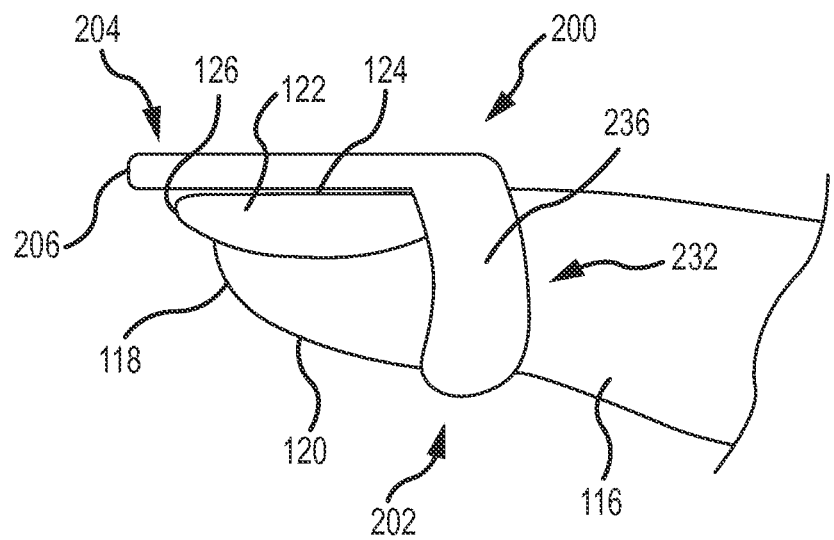
FIG. 10 is a side view of the embodiment of a stylus shown in FIG. 9 engaged with a finger of a user.
Figure 11:
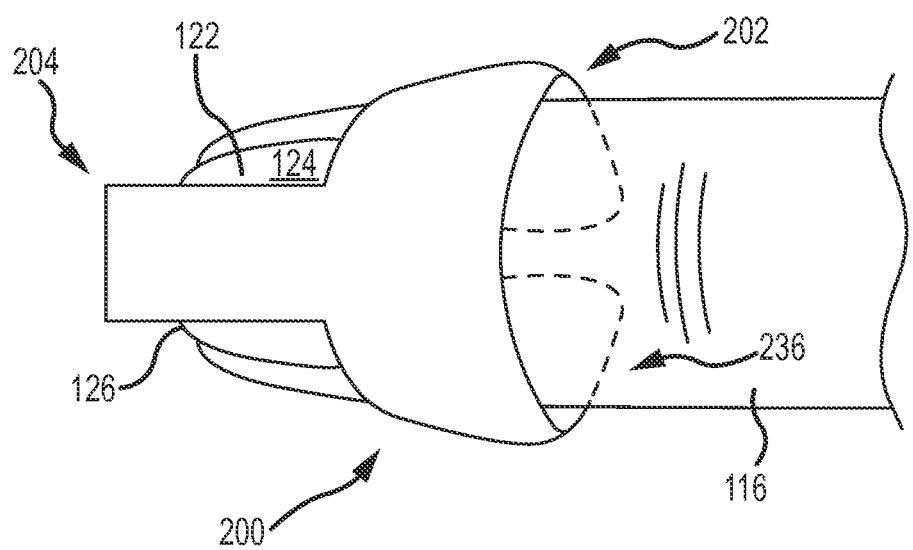
FIG. 11 is a top view of the embodiment of a stylus shown in FIG. 9 engaged with a finger of a user.

With reference to FIGS. 9-11, an additional embodiment of a stylus 200 is shown. The stylus 200 may include a finger engagement portion 202 and an extension portion 204 extending distally from the finger engagement portion 202. The stylus 200 also includes a contact surface 206.

The finger engagement portion 202 of the stylus 200 may include an attachment structure 232 including opposing arcuate projections 236 with free end portions 238. In this regard, the finger attachment structure 232 may function in a similar manner as the finger engagement structure 132 discussed above with reference to FIG. 4. Additionally, the embodiment of the stylus 200 may incorporate any or all of the features described above with respect to the stylus 100. For example, the contact surface 206 may include any or all of the characteristics described with respect to the contact surface 106.

With reference to FIGS. 12-19, additional embodiments of styluses (e.g. 250, 260, 270) that are attachable to the finger 116 (e.g., the fingernail 122) of a user are depicted. The styluses (250, 260, 270) may be adapted to be attached to the finger 116 and/or fingernail 122 of the user and remain attached thereto for extended durations of time (i.e., periods of time longer than that of styluses 100 and 200 described above). As such, the styluses (250, 260, 270) may be permanently or semi-permanently attached to the finger 116 of a user, for example, using an adhesive. The styluses (250, 260, 270) may be provided such that the size and/or shape thereof do not substantially interfere with other tasks performed by a user (e.g., typing, writing, other day-to-day tasks, etc.).

Figure 12:
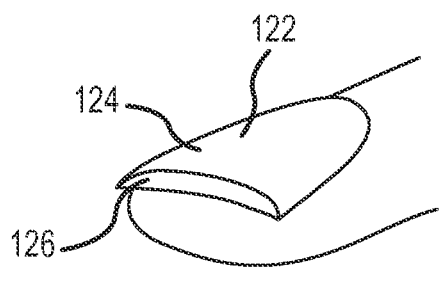
FIGS. 12-19 illustrate various embodiments of a stylus for use with a capacitive touch panel that is attachable to finger of a user.
Figure 13:
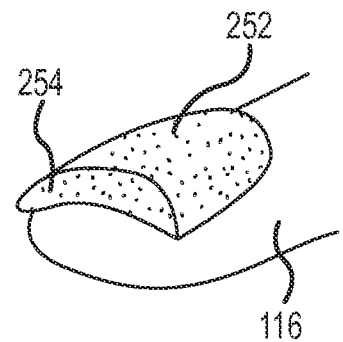

With reference to FIG. 12, a perspective view of a finger 116 with a fingernail 122 having an exposed top surface 124 and a distal edge 126 is shown. FIG. 13 shows the finger 116 with base material 252 applied to the fingernail 122. As can be appreciated, the distal edge 126 of the fingernail, when contacted with a capacitive touch panel, may not present a sufficient contact area to affect the capacitive sensor of the capacitive touch panel. Furthermore, the conductivity of the fingernail 122 may not be sufficient to affect the capacitive sensor of the capacitive touch panel. In this regard, the base material 252 may be applied to the fingernail 122 so as to define a distal surface 254 of sufficient size to affect the capacitive sensor of the capacitive touch panel. The base material 252 may serve as a platform to support an electrically conductive contact surface as will be described further below.

Figure 14:
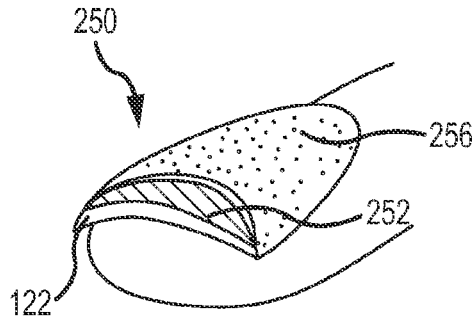
Figure 15:
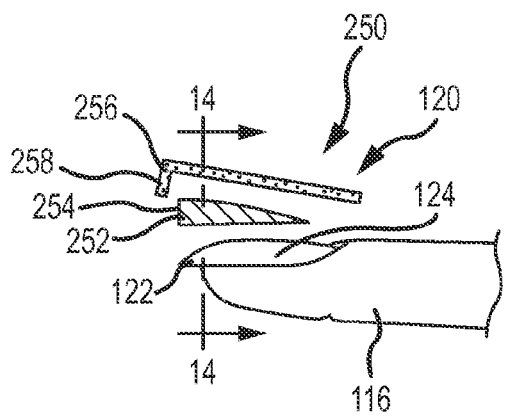

FIGS. 13 and 14 depict an embodiment of a stylus 250. FIG. 14 shows a cross sectional view in an assembled state taken along section line 13-13 of the exploded view shown in FIG. 15. In this regard, it will be appreciated that the base material 252 may be applied to the exposed top surface 124 of the fingernail 122 to provide a distal surface 254 with an area larger than the area available on the distal edge 126 of the fingernail 122. An electrically conductive material 256 may be applied to the base material 252. The electrically conductive material 256 may cover the distal surface 254 to define a contact surface 258 of the stylus 250. The electrically conductive material 256 may also be in contact with the finger 116 and provide an electrically conductive path between the contact surface 258 and the finger 116 (e.g., at a finger engagement portion 120 of the electrically conductive material 256). Accordingly, when the contact surface 258 is contacted to a capacitive touch panel, the capacitive sensor thereof may be affected such that the capacitive touch panel may be manipulated. In this regard, contact surface 258 may include any of the attributes or features discussed above in relation to contact surface 106.

Figure 16:
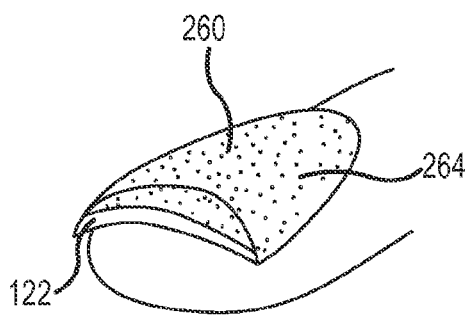
Figure 17:
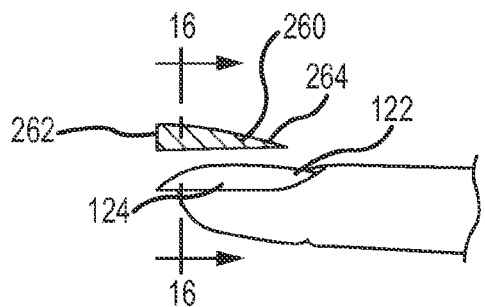

Alternatively, as shown in FIGS. 16 and 17, a stylus 260 comprising an electrically conductive material 264 may be provided. FIG. 16 shows a cross-sectional view in an assembled state taken along section line 15-15 of the exploded view shown in FIG. 17. The stylus 260 may be attached to the exposed top surface 124 of the fingernail 122. For example, the stylus 260 may be attached to the exposed top surface 124 by way of an adhesive (e.g., an electrically conductive adhesive). As such, an electrically conductive path may be provided through the stylus 260 such that a contact surface 262 defined by the electrically conductive material 264 is in electrical communication with the finger 116. Accordingly, when the stylus 260 is mounted to the finger 116 and the contact surface 262 is contacted with a capacitive touch panel, the capacitive sensor of the capacitive touch panel may be affected. In this regard, contact surface 262 may include any of the attributes of features discussed above in relation to the contact surface 160.

Figure 18:
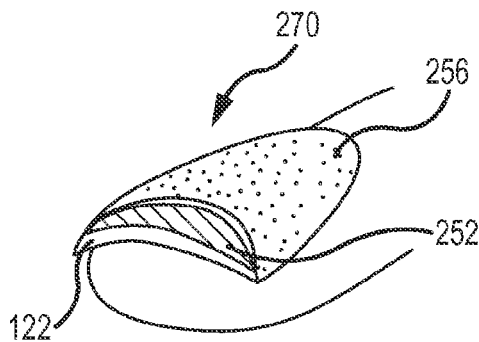
Figure 19:
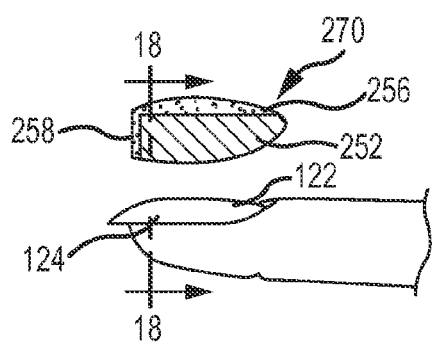

FIGS. 18 and 19 depict another embodiment of a stylus 270. FIG. 18 shows a cross-sectional view in an assembled state taken along section line 18-18 of the exploded view shown in FIG. 19. The stylus 270 may include a base material 252 and an electrically conductive material 256. In this regard, the base material 252 and electrically conductive material 256 may be joined prior to attachment to the fingernail 122. The electrically conductive material 256 may contact the finger 116 so as to establish an electrically conductive path between a contact surface 258 and the finger 116.

As can be appreciated, the styluses 250, 260 and 270 may be applied to the exposed top surface 124 of the fingernail 122 such that at least a portion of the nail exposed top surface 124 may be covered by the stylus 250, 267, or 270 when attached to the fingernail 122. Furthermore, substantially all of the exposed top surface 124 may be covered by the stylus 250, 260, or 270 when attached to the fingernail 122. The styluses 250, 260 and 270 may be attached to the fingernail 122 by way of an adhesive (e.g., a conductive adhesive) or the like. Furthermore, the styluses 250, 260 and 270 may be colored or include decorative features, for example, similar to those available for artificial fingernails as is known in the artificial fingernail art. For example, the styluses 250, 260, or 270 may be provided in a kit, which may include additional accessories. In one example, the electrically conductive material 256 may be provided in a kit with the base material 252. As such, the kit may include the base material 252 and the electrically conductive material 256 for attachment to the fingernail 122. The base material 252 and electrically conductive material 256 may be provided in the kit in a pre-joined configuration or separately such that the base material 252 and the electrically conductive material 256 are ready to be joined as part of a procedure for attachment to the fingernail 122. The kit may also include additional fingernail accessories (e.g., polish, adhesive, fingernail grooming accessories, etc.).

Figure 20:
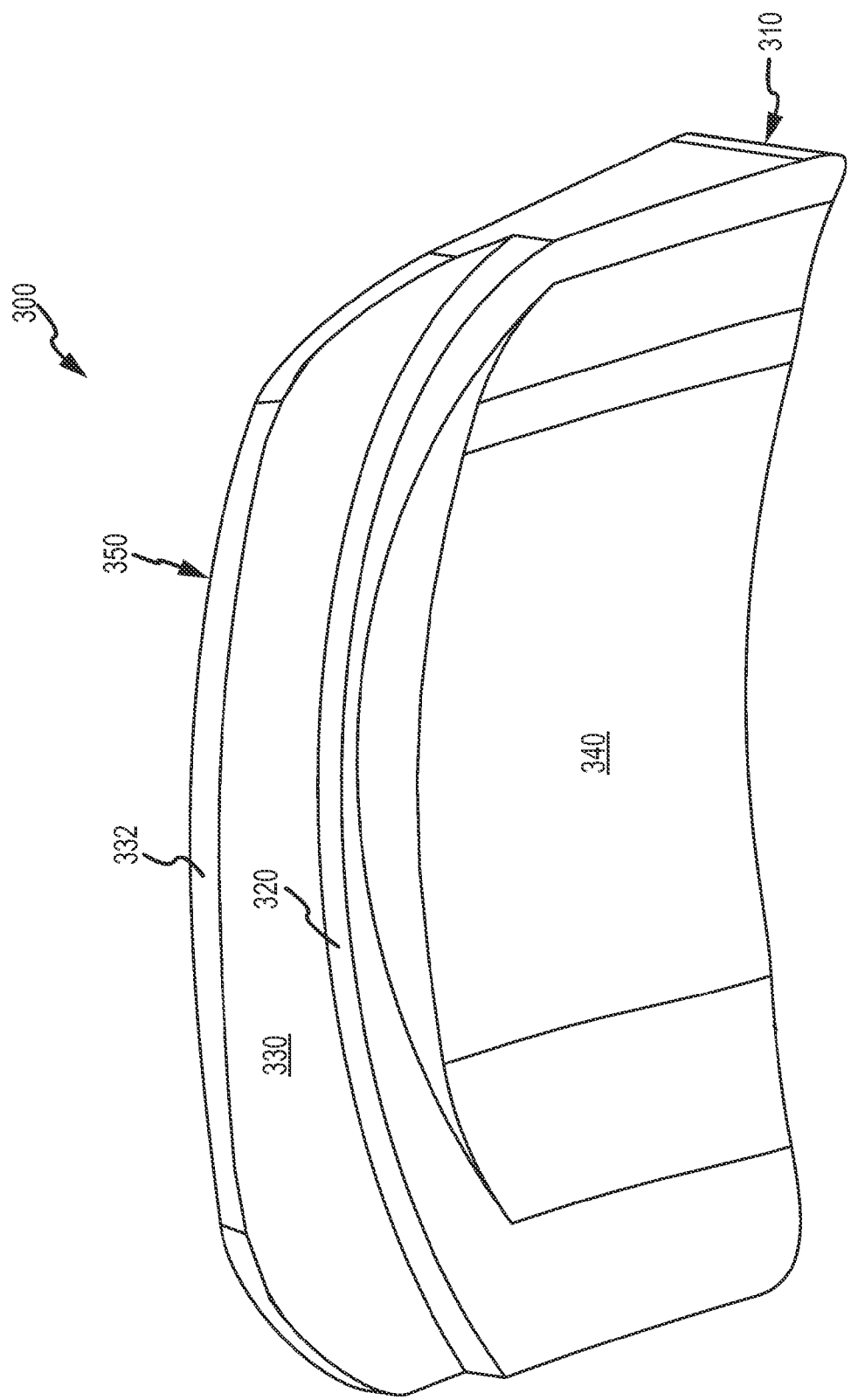
FIG. 20 illustrates yet another embodiment of a stylus for use with a capacitive touch panel.

With further reference to FIG. 20, an embodiment of a stylus 300 is shown that may be applied to the exposed top surface of a fingernail (e.g., similarly to styluses 250, 260, or 270 described above). The stylus 300 may have a contact surface 310 disposed at a distal portion of the stylus 300. The contact surface 310 may generally include any of the features (e.g., dimensions, etc.) described above with the contact surfaces of any of the foregoing embodiments. The stylus 300 may also include a thickened portion 340 adjacent to the contact surface 310. The thickened portion 340 may allow for the contact surface 310 to have sufficient surface area to manipulate a capacitive touch panel as described above.

The stylus 300 may also include a finger engagement portion 350 disposed at a proximal end of the stylus 300 opposite the contact surface 310. The finger engagement portion 350 may include an engagement surface 330 that may contact and be secured to the exposed top surface of a fingernail. In this regard, the engagement surface 330 may facilitate electrical communication between the exposed top surface of a fingernail and the stylus 300. The engagement surface 330 may, in at least some embodiments, be secured to the fingernail of a user by way of an adhesive. For example, a pressure sensitive adhesive may be used to secure the stylus 300 to the fingernail of a user. The adhesive may be applied to the engagement surface 330 at the time the stylus 300 is applied or may be pre-applied to the engagement surface 330. For example, a protective sheet (not shown) may be removed from the engagement surface 330 to expose a pre-applied adhesive. An adhesive used to secure the stylus 300 to the fingernail of a user may be conductive.

The stylus 300 may also include a registration feature that may assist in registration of the stylus 300 with respect to the fingernail of the user. For example, the registration feature may comprise a ridge 342 defined in the stylus 300. The ridge 342 may contact a distal edge of the fingernail to register the stylus 300 with respect to the fingernail of the user. In this regard, when the stylus 300 is secured to the fingernail of a user, the ridge 342 may be abutted to the distal edge of the fingernail and the contact surface 330 adhered to the exposed top surface of the fingernail. As such, the relative placement of the stylus 300 to the fingernail may be established by way of registration of the ridge 342 relative to the distal edge of the fingernail. The foregoing discussion has been presented for purposes of illustration and description and to disclose the best mode contemplated for practicing the teachings contained herein. The foregoing is not intended to limit the claims contained herein to only the form or forms specifically disclosed. Although the description has included description of one or more embodiments and certain variations and modifications, other variations and modifications are within the scope of the present disclosure, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed aspect, embodiment, implementation, variation or configuration may be combined in any combination with one or more features of any other aspect, embodiment, implementation, variation or configuration.

What is claimed is:

1. A finger mountable stylus for use with a capacitive touch panel to manipulate the capacitive touch panel by affecting a capacitive sensor of the capacitive touch panel with the stylus, the stylus comprising:

a finger engagement portion configured to engage with a finger when the stylus is mounted to the finger for use with a capacitive touch panel;

an extension portion configured to extend beyond a distal tip of the finger when the stylus is mounted to the finger;

an electrically conductive contact surface at the distal end of the extension portion, the contact surface configured to make contact with the capacitive touch panel to manipulate the capacitive touch panel, wherein the contact surface has a first dimension extending in a direction corresponding to a width direction of the finger and the contact surface has a second dimension extending in a direction corresponding to a depth direction of the finger, wherein the contact surface has a sufficient area to affect the capacitive sensor of the capacitive touch panel when the contact surface is contacted with the capacitive touch panel, the area of the contact surface being not smaller than about 0.4 mm$^2$ and the area of the contact surface being not larger than about 25 mm$^2$; and an electrically conductive path between the contact surface and the finger engagement portion to establish electrical communication between the capacitive touch panel and the finger when the stylus is mounted to the finger and when the contact surface contacts the capacitive touch panel to manipulate the capacitive touch panel.

2. A stylus according to claim 1, wherein the area of the contact surface is not smaller than about 16 mm$^2$.

3. A stylus according to claim 1, wherein the first dimension is larger than the second dimension.

4. A stylus according to claim 3, wherein the first dimension is in a range of from 3 mm to 12 mm.

5. A stylus according to claim 3, wherein the first dimension is in a range from 4 mm to 8 mm.

6. A stylus according to claim 3, wherein the second dimension is in a range of from 0.075 mm to 5 mm.

7. A stylus according to claim 3, wherein the second dimension is in a range of from 1 mm to 2.5 mm.

8. A stylus according claim 1, wherein the extension portion disposes the contact surface distally beyond a distal tip of the finger by a distance not smaller than 0.5 mm when the stylus is mounted to the finger.

9. A stylus according to claim 8, wherein the contact surface extends in a direction corresponding with the second dimension above a corresponding adjacent portion of an exposed top surface of a fingernail of the finger by not larger than about 3 mm when the stylus is mounted to the finger.

10. A stylus according to claim 9, wherein the contact surface extends in a direction corresponding with the second dimension below a corresponding adjacent portion of an exposed top surface of a fingernail of the finger by not larger than about 3 mm when the stylus is mounted to the finger.

11. A stylus according to claim 1, wherein the contact surface is deformable and the contact surface deforms to conformably contact the surface of the capacitive touch panel when contacted with the capacitive touch panel to manipulate the capacitive touch panel.

12. A stylus according to claim 1, wherein the electrically conductive path comprises a material chosen from the group consisting of: electrically conductive metals, metallic alloys, gold, copper, silver, aluminum, steel, electrically conductive polymers, a polymer comprising a conductive additive, electrically conductive paints, electrically conductive films, electrically conductive adhesives, electrically conductive tapes, transparent electrically conductive oxides, and any combinations thereof.

13. A stylus according to claim 12, wherein the stylus consists essentially of an electrically conductive material.

14. A stylus according to claim 13, wherein the stylus consists essentially of an electrically conductive polymer.

15. A stylus according to claim 1, wherein the extension portion is configured to dispose the contact surface beyond a distal edge of the fingernail when the stylus is mounted to the finger.

16. A stylus according to claim 15, wherein the contact surface is disposed beyond the distal edge of the fingernail by not smaller than about 0.5 mm.

17. A stylus according to claim 1, wherein the finger engagement portion comprises an attachment surface for attachment to at least a portion of an exposed top surface of the fingernail when the stylus is mounted to the finger.

18. A stylus according to claim 17, wherein the attachment surface contacts substantially all of the exposed top surface of the fingernail when the stylus is mounted to the finger.

19. A stylus according to claim 1, wherein the finger engagement portion comprises an attachment structure adapted for sliding attachment to a finger.

20. A stylus according to claim 19, wherein the attachment structure is sized to extend about at least a portion of the finger, wherein the attachment structure is adapted to grippingly engage a finger when the stylus is mounted to the finger.

21. A stylus according to claim 20, wherein the attachment structure includes a first and a second opposing arcuate projection, each of the first and the second opposing arcuate projections including a free end portion, wherein the free end portions are spaced apart and opposing.

* * * * *